US012450307B2

(12) United States Patent
Kirchner et al.

(10) Patent No.: US 12,450,307 B2
(45) Date of Patent: Oct. 21, 2025

(54) METHOD FOR MAPPING AN INPUT VECTOR TO AN OUTPUT VECTOR BY MEANS OF A MATRIX CIRCUIT

(71) Applicants: Robert Bosch GmbH, Stuttgart (DE); Fraunhofer-Gesellschaft zur Förderung der angewandten Forschung e. V., Munich (DE)

(72) Inventors: Tobias Kirchner, Stuttgart (DE); Taha Soliman, Stuttgart (DE); Thomas Kaempfe, Munich (DE)

(73) Assignees: Robert Bosch GmbH, Stuttgart (DE); Fraunhofer-Gesellschaft zur Förderung der angewandten Forschung e. V., Munich (DE)

( * ) Notice: Subject to any disclaimer, the term of this patent is extended or adjusted under 35 U.S.C. 154(b) by 139 days.

(21) Appl. No.: 18/532,826

(22) Filed: Dec. 7, 2023

(65) Prior Publication Data

US 2024/0193228 A1 Jun. 13, 2024

(30) Foreign Application Priority Data

Dec. 7, 2022 (DE) .................. 10 2022 213167.3

(51) Int. Cl.
*G06F 17/16* (2006.01)
*G06F 7/544* (2006.01)
*G11C 11/54* (2006.01)

(52) U.S. Cl.
CPC ............ *G06F 17/16* (2013.01); *G06F 7/5443* (2013.01); *G11C 11/54* (2013.01); *G06F 2207/4824* (2013.01)

(58) Field of Classification Search
CPC ...... G06F 17/16; G06F 7/5443; G06F 17/153; G06F 2207/4824; G11C 11/223;
(Continued)

(56) References Cited

U.S. PATENT DOCUMENTS

2011/0310672 A1* 12/2011 Sutardja .................. G11C 11/56
365/185.19
2022/0207344 A1 6/2022 Gokmen

FOREIGN PATENT DOCUMENTS

CN 114584145 A 6/2022

OTHER PUBLICATIONS

German Patent Office Search Report for Application No. 102022213167.3 dated Jul. 5, 2023 (2 pages including statement of relevance).

* cited by examiner

*Primary Examiner* — Jay W. Radke
(74) *Attorney, Agent, or Firm* — Michael Best & Friedrich LLP

(57) ABSTRACT

The disclosure relates to a method for mapping an input vector to an output vector by means of a matrix circuit which has memory cells arranged in a matrix in a plurality of rows and a plurality of columns and first, second and third lines, each memory cell having an adjustable memory state, is connected to the first line (22) of the corresponding row, is connected to the second and third lines of the corresponding column and is set up to generate an electrical current (I1, I2, I3) depending on the memory state and voltages applied to the first, second and third lines, is connected to the second and third lines of the corresponding column and is arranged to conduct an electric current (I1, I2, I3) into the third line (26) as a function of the memory state and voltages applied to the first, second and third lines, each memory cell having a semiconductor switching element (28) with a control terminal which is connected to the second line (24) of the corresponding column; wherein input voltages (U1, U2, U3) corresponding to components of the input vector are applied (110) to the first lines; wherein for each column: a ramp voltage (V1, V2, V3) is applied (120) to the second line
(Continued)

assigned to the column, the level of which is increased with time (130); a total current is detected at the third line assigned to the column and a time period elapsed since a start time of the level increase of the corresponding ramp voltage is determined (150) until the magnitude of the total current reaches a certain current magnitude threshold (Ig) (140); and a component of the output vector corresponding to the column is determined (170) based on the elapsed time period (t1, t2, t3).

15 Claims, 3 Drawing Sheets

(58) Field of Classification Search
CPC ...... G11C 7/1006; G11C 11/54; G06N 3/065; G06N 7/00; G06N 3/063; G06G 7/12; G06G 7/16; G06G 7/22
See application file for complete search history.

METHOD FOR MAPPING AN INPUT VECTOR TO AN OUTPUT VECTOR BY MEANS OF A MATRIX CIRCUIT

BACKGROUND OF THE INVENTION

The present disclosure relates to a method for mapping an input vector to an output vector by means of a matrix circuit, and a circuit.

In many computationally intensive tasks, especially in artificial intelligence applications or machine learning applications that use neural networks, the determination of scalar products of vectors is required. For example, the convolutions in a "convolutional neural network", hereinafter referred to as CNN, are scalar products of vectors. In order to perform such vector operations quickly and efficiently, vector matrix multipliers can be used in the form of specially designed circuits.

In these vector-matrix multipliers, which are also known as "dot product engines", a vector of input voltages is converted into a vector of output voltages by means of a matrix arrangement of memristors, which are arranged at intersections of orthogonal lines and which connect the intersecting lines in pairs, into a vector of output voltages, whereby the output voltages are each proportional to the scalar product ("dot product") of the vector of input voltages with the conductivities of the memristors arranged in a column. The input voltages are applied to the row lines running in one direction and lead to currents via the memristors into the column lines running orthogonally to them, which are connected to a ground potential. The currents are converted into the output voltages using transimpedance amplifiers. Such circuits can reach sizes of several 100 or 1000 rows and columns.

SUMMARY OF THE INVENTION

According to the present disclosure, a method for mapping an input vector to an output vector by means of a matrix circuit, and a circuit with the features of the independent patent claims are proposed. Advantageous embodiments are the subject of the dependent claims and the following description.

The disclosure makes use of the measure of measuring a time period (time span) instead of a current in a matrix circuit as an indicator of a product sum of input components and weighting components. This enables energy-efficient operation. In particular, analog-to-digital converters can be dispensed with, which are otherwise used to determine the intensity/strength (magnitude) of the total current and which, however, typically have a high space requirement and high energy consumption during operation (in each case in relation to the entire circuit in which the matrix circuit is used).

In detail, the matrix circuit has memory cells and first, second and third lines arranged in a matrix in several rows and several columns, whereby one of the first lines is assigned to each row and one of the second and one of the third lines is assigned to each column.

Each memory cell has an adjustable memory state and is connected to the first line, which is assigned to the row in which the memory cell is located, and to the second line and the third line, which are assigned to the column in which the memory cell is located. Each memory cell is set up to conduct an electric current from the first line to the third line depending on the memory state and the voltages applied to the first, second and third lines.

Each memory cell has a semiconductor switching element with a control terminal that is connected to the second line assigned to the column in which the semiconductor switching element is located.

Input voltages corresponding to components of the input vector are applied to the first lines. For each column, a ramp voltage is applied to the second line assigned to the column, the level of which is increased with time, and a total current is detected on the third line assigned to the column and a time period elapsed since a start time of the level increase of the corresponding ramp voltage (i.e. at the second line assigned to the column) is determined, up to which the intensity of the total current reaches a certain current intensity threshold. Furthermore, components of the output vector corresponding to the columns are determined based on the elapsed time.

In particular, the semiconductor switching elements (e.g., ferroelectric field-effect transistors) can have an adjustable threshold voltage, wherein the memory state of a memory cell depends on the respective threshold voltage. The semiconductor switching elements also have, for example, a drain connection and a source connection. The drain connection is connected to the first line, for example. The source connection is connected to the third line, for example.

The term "connected" is to be understood in each case in the sense of "electrically conductively connected", whereby additional resistors and/or memristors may be provided in such connections. Accordingly, the terms "voltage" and "current" denote an "electrical voltage" and an "electrical current" respectively.

In particular, the time spans can be determined or counted as the number of elapsed clock cycles. The clock cycles are given, for example, by a clock signal of a certain frequency. Accordingly, the time spans can be easily determined by controlling the matrix circuit.

A circuit according to the disclosure has a matrix circuit as described above and a controller or control circuit which is set up to carry out a method according to the disclosure.

BRIEF DESCRIPTION OF THE DRAWINGS

Further advantages and embodiments of the disclosure are shown in the description and the accompanying drawing.

The disclosure is illustrated schematically in the drawing by means of embodiment examples and is described below with reference to the drawing.

DETAILED DESCRIPTION

Figure 1A:
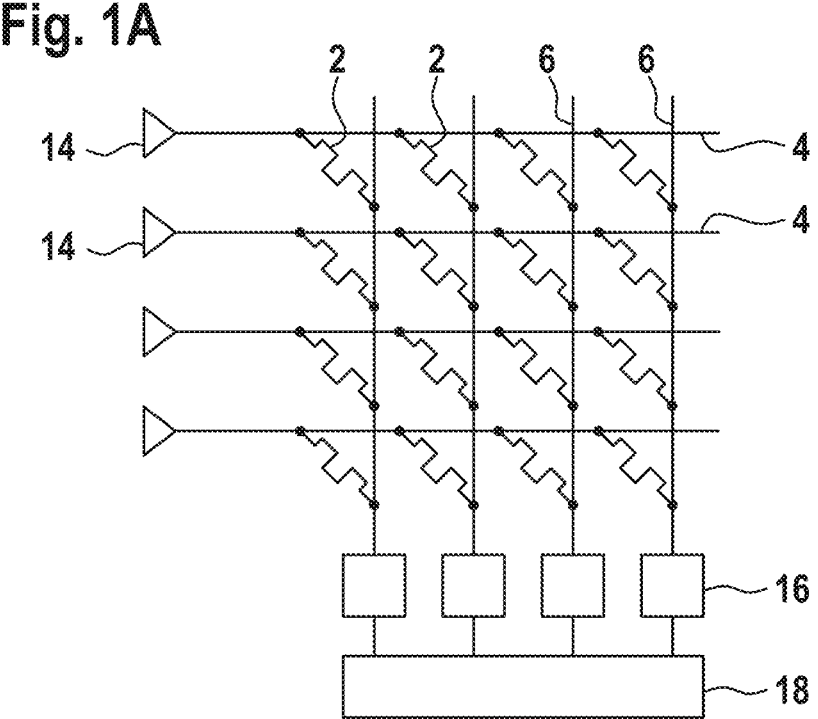
FIGS. 1A and 1B show a vector matrix multiplier not according to the disclosure.
Figure 1B:
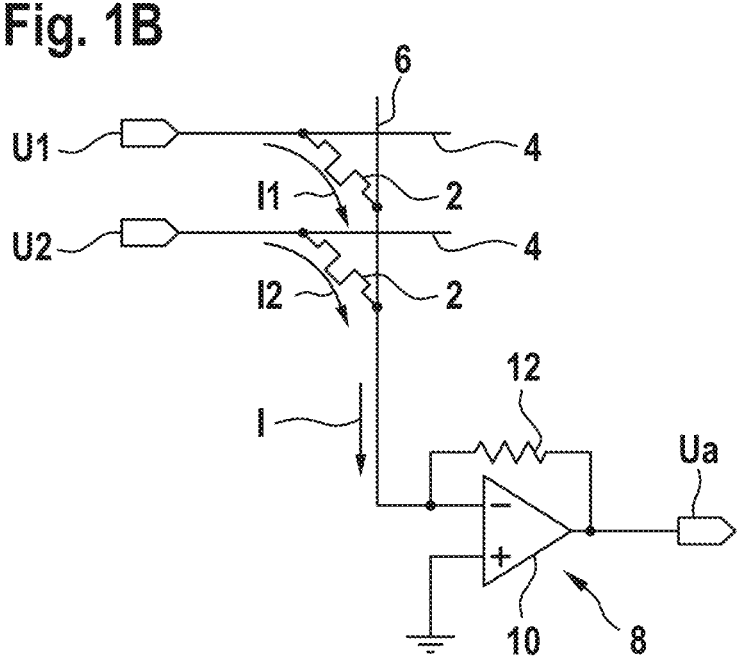

FIGS. 1A and 1B illustrate the functional principle of a vector-matrix multiplier not according to the disclosure, also referred to as a matrix circuit or "dot product engine". The vector matrix multiplier comprises memory cells arranged in rows and columns in a matrix in the form of memristors 2. The number of rows and the number of columns are arbitrary in each case, whereby a 4×4 arrangement is shown as an example. The memory function of the memristors results from the fact that the resistance of the memristors can be adjusted by applying a programming voltage.

The vector matrix multiplier also comprises a row line 4 for each row of the matrix arrangement and a column line 6 for each column. The memristors 2 are arranged at the intersection points of the mutually perpendicular row and column lines and each connect a row line to a column line which are not connected in any other way.

If voltages are applied to the row lines, currents flow from the row lines 4 through the memristors 2 into the column lines 6. This is illustrated for one column and two rows in FIG. 1B. There, a voltage U1 is applied to one of the row lines and a voltage U2 to the other. The current I1 through one of the memristors is determined by its conductivity G1: I1=G1·U1; the current I2 through the other memristor, whose conductivity is G2, is correspondingly I2=G2·U2. The sum of the currents then flows through the column line 6, i.e., the total current I=I1+I2=G1·U1+G2·U2. The voltages U1, U2 on the row lines 4, which are interpreted as a vector, are multiplied by the conductivities G1, G2 of the memristors in a column, which are interpreted as a vector, whereby the total current is proportional to the result of this vector product. In relation to the entire matrix arrangement, a multiplication of the vector of the voltages with the conductivities of the memristors, interpreted as matrix elements, therefore takes place in principle.

The total current of each column can, for example, be converted into an output voltage Ua by means of a transimpedance amplifier 8 (see FIG. 1B). The transimpedance amplifier 8 shown here as an example and known per se comprises an operational amplifier 10, the inverting input of which is connected to the column line and the non-inverting input of which is connected to ground, and a resistor 12, via which the operational amplifier is counter-coupled, so that the output voltage Ua is given as Ua=−R·I, where R is the resistance value of the resistor 12. The transimpedance amplifier 8 generates a so-called "virtual ground" at the inverting input of the operational amplifier 10, which differs only slightly (e.g. only approx. 50 μV if the voltages U1, U2 are in the range of approx. 5 V) from the ground potential due to the high open-circuit gain of the operational amplifier (e.g. 100,000), so that the ground potential (i.e. the virtual ground) is present at the end of the column line, as required for the function of the circuit.

The voltages on the row lines are typically generated from digital signals using digital-to-analog converters 14. Similarly, the output voltages on the column lines, i.e., the voltages Ua generated by the transimpedance amplifiers, are typically converted back into a digital signal by means of sample-and-hold circuits 16 and analog-to-digital converters 18. The sample-and-hold elements 16 can be integrated in the analog-to-digital converter 18 or in the analog-to-digital converters 18, respectively.

The analog-to-digital converters can result in a considerable space requirement on the chip on which the vector matrix multiplier is implemented and a considerable energy requirement during operation. The area and energy requirements associated with the analog-to-digital conversion can each be in the range of around 30-60% of the total area requirement or the total energy requirement of the circuit.

Figure 2:
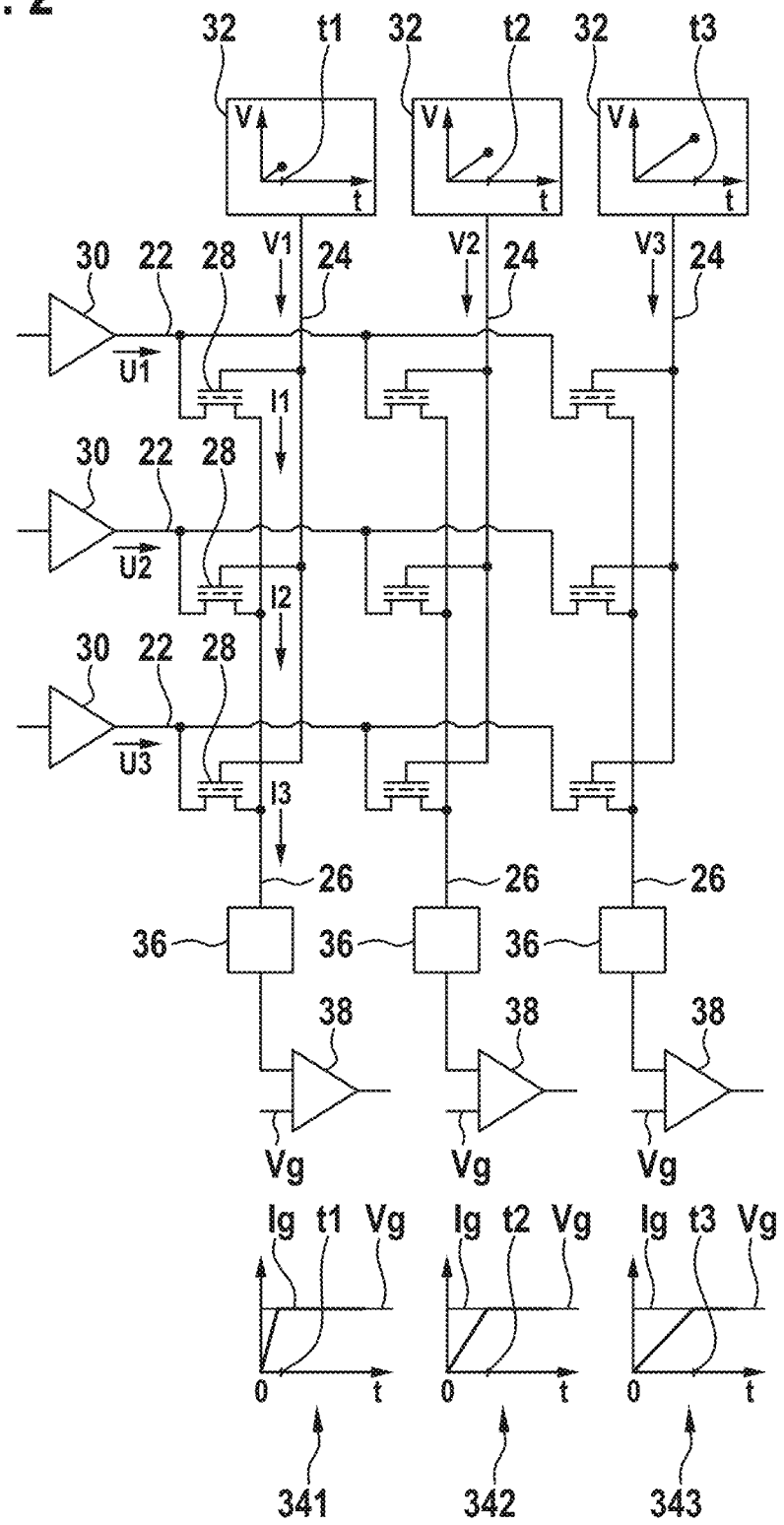
FIG. 2 shows a matrix circuit according to an exemplary embodiment of the disclosure.

FIG. 2 shows a matrix circuit according to an exemplary configuration. The matrix circuit shown has, for example, three rows and three columns. In general, the matrix circuit can have any number of rows and any number of columns.

The matrix circuit has memory cells arranged in matrix form in the rows and columns. Furthermore, the matrix circuit has first lines 22, second lines 24 and third lines 26. Each row is assigned one of the first lines 22; accordingly, the first lines can be regarded as row lines. Each column is assigned one of the second lines 24 and one of the third lines 26; accordingly, the second and third lines can be regarded as column lines. Each memory cell is connected to the first line, which is assigned to the row in which the memory cell is located. Furthermore, each memory cell is connected to the second and third lines, which are assigned to the column in which the memory cell is located.

Each memory cell comprises a semiconductor switching element 28, which has a control terminal (gate terminal), a drain terminal and a source terminal. The drain terminal is connected to that first line 22 which is assigned to the row in which the memory cell with the semiconductor switching element 28 is located. The control terminal is connected to that second line 24 which is assigned to the column in which the memory cell with the semiconductor switching element 28 is located. The source terminal is connected to the third line 26, which is assigned to the column in which the memory cell with the semiconductor switching element 28 is located.

In the embodiment shown, the semiconductor switching elements 28 are semiconductor switching elements with adjustable or programmable threshold voltages. Different memory states of the memory cells correspond to different programmed threshold voltages. In particular, ferroelectric field-effect transistors (FeFET) can be used. Floating gate metal-oxide semiconductor field-effect transistors (FGMOS) could also be used. A corresponding material layer of the FET serves as a memory for the storage states, e.g., a ferroelectric layer in an FeFET or a floating gate in an FGMOS. Memory states correspond to the polarization of the ferroelectric layer in an FeFET or the charge in the floating gate in an FGMOS.

If the voltage on a second line is below the set threshold voltage of a memory cell or a semiconductor switching element, no current or a very low current flows (blocking range or linear range). If the voltage on the second line is above the set threshold voltage (e.g., in the saturation range), an electric current flows through the semiconductor switching element into the corresponding third line.

The memory cells shown are so-called 1T memory cells (1 transistor). The use of so-called 1T1R memory cells, which comprise a semiconductor switching element and a resistor, or so-called 1T1M memory cells, which comprise a semiconductor switching element and a memristor, is also conceivable. The resistor or memristor is then provided in one of the connections between the semiconductor switching element and the lines, i.e., in one of the connections between the drain terminal and the first line, between the control terminal and the second line or between the source terminal and the third line. In 1T1R memory cells, semiconductor switching elements have a programmable threshold voltage, as in the embodiment shown. In 1T1M memory cells, semiconductor switching elements can be provided without a programmable threshold voltage, wherein different memory states correspond to different (programmed) resistance values of the memristors. Alternatively, semiconductor switching elements with programmable threshold voltage can be provided for 1T1M memory cells. In this case, in order to obtain different memory states, both the threshold voltages of the semiconductor switching elements and the resistance values of the memristors can be programmed.

The programming of the memory cells, i.e., the setting or programming of certain memory states of the memory cells, can be carried out in all cases (memristors, semiconductor switching elements, . . . ) by applying programming voltages (which are typically higher than the voltages used during readout). The row or column lines shown and/or separate programming lines (not shown) can be used for this purpose.

As in the vector-matrix multiplier of FIGS. 1A, 1B, digital-to-analog converters 30 can be provided which are set up to apply voltages or input voltages U1, U2, U3 corresponding to components (input components) of an input vector to the first lines 22. The input voltages are thus applied to the drain terminals of the semiconductor switching elements 28.

The matrix circuit can comprise ramp generators 32, which are set up to generate or apply voltages V1, V2, V3, referred to as ramp voltages, to the second lines 24. The ramp voltages are thus applied to the control terminals of the semiconductor switching elements. The ramp voltages are generated by the ramp generators 32 in such a way that their levels rise or are increased with time, i.e., the level of the ramp voltages increases with time starting from a starting point. The increase in the levels can take place from the starting point, e.g., linearly, with a certain rate of increase, whereby the increase in the levels can take place continuously or gradually. The start time can be specified to the ramp generators 32 by a controller (not shown) of the matrix circuit, for example by means of a start signal that is transmitted via a control line. The slew rate of the level increases can be adjustable, for example by the controller, for example via a control line. The level of the ramp voltages can be increased starting from a starting level that is equal to zero (i.e., equal to the ground level) or starting from a starting level that is different from zero (in particular greater than zero). The starting level can be adjustable, e.g., by the control system, for example via a control line.

Depending on the level of the input voltages U1, U2, U3, the ramp voltages V1, V2, V3 and the programmed memory states, i.e. in the illustration of the semiconductor switching elements 28 shown, electrical currents I1, I2, I3 (shown as an example for one column) are conducted through the memory cells or semiconductor switching elements 28 into the third lines 26 (from the first lines 22). Thus, at the end of each of the third lines 26, a respective total current flows, namely the sum of the individual currents conducted into each of the third lines by the memory cells connected to the respective third line (similar to the vector matrix multiplier of FIGS. 1A, 1B).

Due to the level increases of the ramp voltages V1, V2, V3, there is an increase in the intensities of the currents I1, I2, I3 and thus the total currents at the end of the third lines. This is shown in diagrams 341, 342, 343. Due to the different programmed memory states (threshold voltages of the semiconductor switching elements) and the different input voltages U1, U2, U3, the increase in the intensities of the total currents generally occurs at different rates for different third lines 26. The increases in the intensities of the total currents are exemplarily linear in the diagrams shown. In general, the intensities of the total currents can also increase nonlinearly.

It is intended to determine for each third line 26 the time period t1, t2, t3 which elapses until the intensity of the total current in the respective third line reaches or exceeds a certain current intensity threshold Ig (shown in the diagrams as corresponding horizontal lines). The specific current threshold is the same for all third lines. The current threshold can be adjustable or preset (e.g., by the control system). The time spans can, for example, be measured in a simple way as the number of clock cycles, for example by the control of the matrix circuit. Analog-to-digital converters are not necessary, and the associated space requirements and energy consumption during operation are eliminated accordingly.

In order to recognize the points in time at which the current intensity threshold is reached or exceeded, current-voltage converters 36 and comparators 38 connected downstream of these can be used in particular. The current-voltage converters 36 (e.g., transimpedance amplifiers, as in FIG. 1B) generate voltages which are proportional to the intensities of the total currents in the third lines according to a proportionality factor. The voltages generated by the current-to-voltage converters 36 are compared by the comparators 38 with a specific voltage threshold Vg, which corresponds to the specific current intensity (magnitude) threshold Ig, taking into account the proportionality factor. The diagrams 341, 342, 342 can accordingly also be understood as voltage diagrams, with the horizontal lines drawn in corresponding to the determined voltage threshold Vg.

The output signals of the comparators 38 thus indicate the points in time at which the voltage threshold Vg is reached or exceeded, which are equal to the points in time at which the current threshold Ig in the third lines is reached or exceeded. The output signals of the comparators can be detected by the controller of the matrix circuit, for example by means of suitable signal lines. The comparator voltage, i.e., the voltage corresponding to the voltage threshold, can also be provided to the comparators by the controller via suitable control lines.

Components of the output vector (also referred to as output components) are determined according to the time spans. Each third line corresponds to one of the components of the output vector, whereby the value of the components of the output vector is determined as a function of the corresponding time span, in particular as the product of a constant with the time span. Overall, rows thus correspond to components of the input vector and columns to components of the output vector. Input voltages corresponding to the corresponding components of the input vector are applied to the first lines (which are assigned to the respective rows). Corresponding components of the output vector are determined from the elapsed time spans determined on the third lines (which are assigned to the respective columns).

In particular, it is provided that when the current intensity threshold or voltage threshold is reached at a column, i.e., at the third line 26 assigned to the column, the level increase of the ramp voltage at this column, i.e., at the second line 24 assigned to the column, is terminated. This is useful as it avoids unnecessary energy consumption. FIG. 2 illustrates a corresponding termination of the level increases in the ramp generators 32 when the time periods t1, t2, t3 elapse. Corresponding end signals can be transmitted from the controller to the ramp generators (e.g., via control lines).

The matrix circuit can be operated in three different ranges: Range below the threshold voltages, range above the threshold voltages, mixed range. The range in which the matrix circuit is operated is determined by the level of the ramp voltages, given the input voltages and threshold voltages of the semiconductor switching elements (according to their programming).

In the range below the threshold voltages, i.e., voltage (ramp voltage) at the control connection for all semiconductor switching elements below the respective threshold voltage, the semiconductor switching elements represent impedances with a high resistance value. Operation in this range enables operation with very low energy consumption.

At higher voltages at the control connections, some of the semiconductor switching elements may be operated above their threshold voltage, depending on their programming. In this mixing range, the current flow in the corresponding third lines or in the matrix circuit increases. In the mixed range, there is a high current dynamic, i.e., the difference in current intensity between the conductive storage state (e.g. corresponding to a weight of 1) of the semiconductor elements and the non-conductive storage state (e.g. corresponding to a weight of 0) of the semiconductor elements differs by several orders of magnitude. This enables larger matrix circuits, i.e., matrix circuits with a large number of rows or columns.

In the range above the threshold voltages, i.e., the voltages at the control terminals are above the threshold voltages so that the semiconductor switching elements are in the saturation range, the semiconductor switching elements are voltage-controlled current sources. In this range, the currents in the third lines increase and become less dependent on the input voltages. This range can be used for binary input vectors for which the input voltages are either equal to zero or equal to a predetermined non-zero voltage. Due to the higher currents, this range is less susceptible to electromagnetic interference.

Since both the ramp voltages (i.e., their starting level and/or their slew rate) and the current threshold or the voltage threshold are adjustable, in particular by the controller, one of the three ranges can be selected by setting these variables accordingly, in particular by appropriate control, e.g., depending on the intended use.

Figure 3:
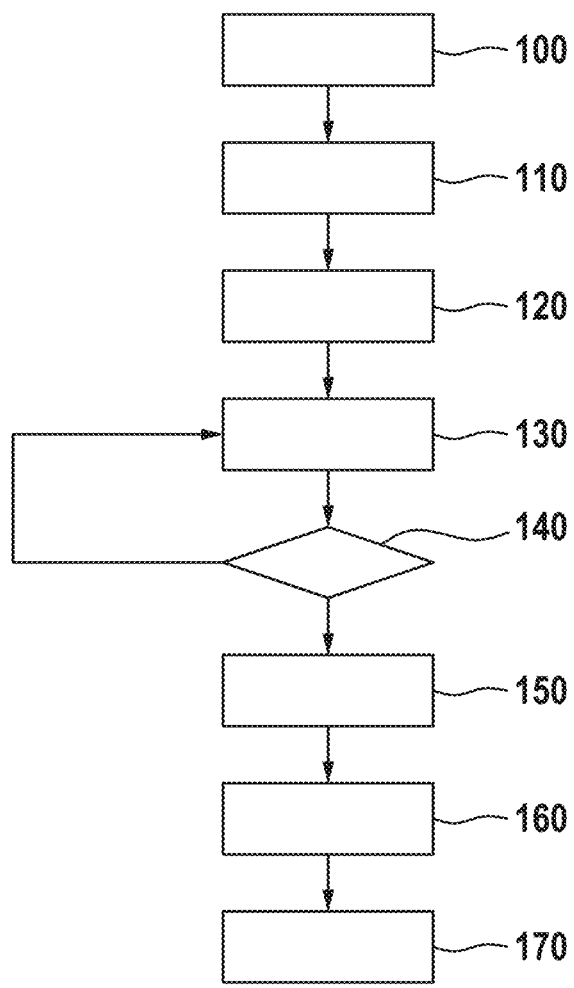
FIG. 3 shows a flow chart according to one embodiment of the disclosure for mapping an input vector to an output vector by means of a matrix circuit.

FIG. 3 shows a flow chart according to one embodiment of the method for mapping an input vector to an output vector using a matrix circuit. The steps essentially correspond to the steps already described in connection with FIG. 2.

In step 100, the memory states of the memory cells, e.g., the semiconductor switching elements with adjustable or programmable threshold voltages, are set or programmed. This is done in particular according to matrix elements of a given (weight) matrix. Matrix elements are assigned to memory elements of the matrix circuit according to the rows and columns of the matrix, for example.

In step 110, voltages or input voltages are applied to the first lines (line lines). The height or level of the input voltages corresponds to respective components of the input vector. For example, the components of the input vector are multiplied (e.g., implicitly during digital-to-analog conversion, for example by the digital-to-analog converters of FIG. 2) by a suitable proportionality factor in order to obtain the input voltages.

In step 120, ramp voltages are applied to the second lines, e.g., at a start time with a predetermined start level (0 V or different from 0 V).

In step 130, the ramp voltages are increased, e.g., continuously or stepwise at a predetermined rate of increase.

In step 140, the third lines are checked to see whether a total electrical current corresponding to a predefined current threshold has been reached. For third lines where this is not the case, the process continues with step 130, increasing the ramp voltage.

In step 150, the elapsed time since the start of the level increase of the ramp voltage, e.g., since the start time, is determined, e.g., measured in clock cycles, for third lines at which the current level threshold was reached or exceeded.

In an optional step 160, which can also take place before or at least partially in parallel with step 150, the level increase of the respective ramp voltage is terminated and/or the application of the ramp voltage to the corresponding second line (i.e. to the second line that is assigned to the same column as the third line at which the current level threshold was reached or exceeded) is terminated (i.e. the voltage at the second line is changed to 0 V, corresponding to a ground potential) for third lines at which the current level threshold was reached or exceeded.

Steps 130, 140, 150 and, if necessary, 160 can be carried out until the current threshold has been reached on all third lines or, if this does not occur for one or more third lines, until the ramp voltage reaches an upper limit.

In step 170, which may occur after step 150 for columns whose third lines have reached the current threshold, the determined elapsed time spans are converted into corresponding components of the output vector, for example by multiplication by a suitable proportionality factor. Optionally, in the aforementioned case that the current threshold is not reached for one or more third lines, it may be provided to set the corresponding components of the output vector to a value corresponding to the elapsed time until the upper limit of the ramp voltage is reached, or to a predetermined error or overflow value.

INFORMATION ON FUNDING AND SUPPORT

The project leading to this application has received funding from the ECSEL Joint Undertaking (JU) under grant agreement No 826655. The JU receives support from the European Union's Horizon 2020 research and innovation program and Belgium, France, Germany, Netherlands, Switzerland

The invention claimed is:

1. A method of mapping an input vector to an output vector by means of a matrix circuit, which has first lines, second lines, third lines, and memory cells arranged in a matrix in a plurality of rows and a plurality of columns,
wherein each of the first lines is assigned to a respective row of the plurality of rows, each of the second lines is assigned to a respective column of the plurality of columns, and each of the third lines is assigned to a respective column of the plurality of columns,
wherein input voltages corresponding to components of the input vector are applied to the first lines,
wherein each memory cell
has an adjustable memory state,
is connected to one of the first lines assigned to the row in which the memory cell is located,
is connected to one of the second lines assigned to the column in which the memory cell is located,
is connected to one of the third lines assigned to the column in which the memory cell is located,
is configured to conduct an electric current from the one of the first lines to the one of the third lines as a function of the adjustable memory state and of voltages applied to the one of the first lines, the one of the second lines, and the one of the third lines, and
comprises a semiconductor switching element having a control terminal connected to the one of the second lines assigned to the column in which the semiconductor switching element is located,
the method comprising the following steps for each column:
applying a respective ramp voltage to the second line assigned to the column;
increasing the level of the respective ramp voltage over time;
detecting a respective total current at the third line assigned to the column;
determining a respective time period that has elapsed from a start time of the step of increasing the level of the respective ramp voltage until a respective certain current magnitude threshold is reached by a magnitude of the respective total current; and determining a respective component of the output vector corresponding to the column based on the respective time period.

2. The method according to claim 1, wherein each of the semiconductor switching elements of the matrix has a respective adjustable threshold voltage, and the adjustable memory state of a memory cell is dependent on the respective adjustable threshold voltage.

3. The method according to claim 1, further comprising for each column, terminating the step of increasing the level of the respective ramp voltage when the respective certain current magnitude threshold is reached.

4. The method according to claim 1, further comprising, for each column, terminating the step of applying the respective ramp voltage when the respective certain current magnitude threshold is reached.

5. The method according to claim 1, further comprising beginning the step of increasing the level of the respective ramp voltage at several columns at a same starting time.

6. The method according to claim 1, wherein a rate of increasing the level of the respective ramp voltage at several columns is a same rate.

7. The method according to claim 1, wherein the input voltages are proportional to the components of the input vector, and each determined component of the output vector is proportional to a corresponding column's determined respective time period.

8. The method according to claim 1, further comprising setting the memory states of the memory cells according to matrix elements of a predetermined matrix.

9. The method according to claim 1, wherein each determined respective time period is based on a number of elapsed clock cycles.

10. A circuit comprising
a matrix circuit, which has first lines, second lines, third lines, and memory cells arranged in a matrix in a plurality of rows and a plurality of columns,
wherein each of the first lines is assigned to a respective row of the plurality of rows, each of the second lines is assigned to a respective column of the plurality of columns, and each of the third lines is assigned to a respective column of the plurality of columns,
wherein each memory cell
has an adjustable memory state,
is connected to one of the first lines assigned to the row in which the memory cell is located,
is connected to one of the second lines assigned to the column in which the memory cell is located,
is connected to one of the third lines assigned to the column in which the memory cell is located,
is configured to conduct an electric current from the one of the first lines to the one of the third lines as a function of the adjustable memory state and of voltages applied to the one of the first lines, the one of the second lines, and the one of the third lines, and
comprises a semiconductor switching element having a control terminal connected to the one of the second lines assigned to the column in which the semiconductor switching element is located, and a controller configured to perform the following steps for each column:
apply a respective ramp voltage to the second line assigned to the column;
increase the level of the respective ramp voltage over time;
detect a respective total current at the third line assigned to the column;
determine a respective time period that has elapsed from a start time of the increasing the level of the respective ramp voltage until a respective certain current magnitude threshold is reached by the magnitude of the respective total current; and
determine a respective component of the output vector corresponding to the column based on the respective time period.

11. The circuit according to claim 10, wherein each of the semiconductor switching elements is a ferroelectric field-effect transistor having a respective adjustable threshold voltage, wherein the adjustable memory state of the memory cell comprising the semiconductor switching element depends on the respective adjustable threshold voltage.

12. The circuit according to claim 10, wherein each of the memory cells comprises a memristor and/or resistor, wherein the adjustable memory state of the respective memory cell depends on a resistance value of the memristor or the resistor.

13. The circuit according to claim 10, wherein each of the semiconductor switching elements comprises a drain terminal and a source terminal, wherein the drain terminal is connected to the first line assigned to the row in which the respective semiconductor switching element is located, and the source terminal is connected to the third line assigned to the column in which the respective semiconductor switching element is located.

14. The circuit according to claim 10, further comprising one or more ramp generators connected to the second lines and configured to perform the step of increase the level of the respective ramp voltage.

15. The circuit according to claim 10, further comprising current-voltage converters connected to the third lines and comparators connected downstream of these, which are set up to compare output voltages of transimpedance amplifiers with voltage thresholds corresponding to the certain respective current magnitude thresholds.

* * * * *